(12) United States Patent
Okumura

(10) Patent No.: US 7,542,847 B2
(45) Date of Patent: Jun. 2, 2009

(54) MAP DISPLAY DEVICE

(75) Inventor: Tatsuya Okumura, Anjo (JP)

(73) Assignee: Denso Corporation, Kariya (JP)

( * ) Notice: Subject to any disclaimer, the term of this patent is extended or adjusted under 35 U.S.C. 154(b) by 508 days.

(21) Appl. No.: 11/390,082

(22) Filed: Mar. 28, 2006

(65) Prior Publication Data

US 2006/0224315 A1 Oct. 5, 2006

(30) Foreign Application Priority Data

Mar. 31, 2005 (JP) ............................. 2005-103267
May 10, 2005 (JP) ............................. 2005-137311

(51) Int. Cl.
*G01C 21/00* (2006.01)

(52) U.S. Cl. .................................. 701/211; 340/995.1

(58) Field of Classification Search ......... 701/211–213, 701/207–209; 340/995.1, 995.12, 995.14–995.15, 340/995.17–995.19; 342/357.13
See application file for complete search history.

(56) References Cited

U.S. PATENT DOCUMENTS

| 3,299,539 | A  | * | 1/1967 | Leiber ................... 235/61 NV |
| 6,246,958 | B1 | * | 6/2001 | Hirono ....................... 701/208 |
| 6,600,993 | B1 |   | 7/2003 | Kaneko et al. |
| 6,868,334 | B2 | * | 3/2005 | Nakane et al. .............. 701/208 |

FOREIGN PATENT DOCUMENTS

| JP | A-2-151715    | 6/1990  |
| JP | A-9-139686    | 5/1997  |
| JP | A-2000-283778 | 10/2000 |
| JP | A-2003-130651 | 5/2003  |
| JP | 2004-349884   | 12/2004 |

* cited by examiner

*Primary Examiner*—Dalena Tran
(74) *Attorney, Agent, or Firm*—Posz Law Group, PLC

(57) ABSTRACT

A map display device having a corridor function includes a control unit and display unit. In the corridor function, the control unit clips a part of map data corresponding to a region, which includes a reference point at a central part of the region, and stores the part of map data in a memory; the display unit displays a map of the region based on the stored part of map data.

16 Claims, 10 Drawing Sheets

MAP DISPLAY DEVICE

CROSS REFERENCE TO RELATED APPLICATION

This application is based on and incorporates herein by reference Japanese patent application No. 2005-103267 filed on Mar. 31, 2005 and No. 2005-137311 filed on May 10, 2005.

FIELD OF THE INVENTION

The present invention relates to a map display device. The map display device clips a part of map data from a storage medium, stores the clipped part in a memory for a corridor function, and displays a map based on the clipped part of the map data in the memory for the corridor function. The corridor function is typically used in a situation when the map display device cannot access the map data storage medium.

BACKGROUND OF THE INVENTION

There are navigation devices that are capable of navigating a driver to a destination while playing a DVD or CD, e.g., while allowing the driver to watch a DVD or listen to a CD. It is because those navigation devices can access a map data storage medium such as a hard-disk drive (HDD) or DVD-ROM, regardless of playing the DVD or CD. However, if a user wishes to play the DVD or CD with a navigation device, which accesses a DVD-ROM for map data and has only one disk slot, the DVD-ROM (map data storage medium) needs to be drawn out. In such a situation, the navigation device cannot navigate a driver nor display a map, since it can no longer access the map data storage medium, i.e., DVD-ROM that has been drawn out.

A corridor function for a display device is described in Patent Document 1. The corridor function is a function for clipping a part (or all) of map data stored in, for example, a DVD-ROM, storing the clipped part in a memory (e.g., RAM) for the corridor function, and displaying a map based on the clipped part of the map data in the memory for the corridor function.

In many cases, the memory for the corridor function does not have an enough memory space to memorize all of the map data. An amount of the part of the map data is restricted by an amount of the space of the memory for the corridor function. Therefore, it is desirable to find a method to clip the part of the map data effectively.

In a navigation device described in Patent Document 1, the clipped part of the map data extends along a route selected based on a user's operation. Thus, the memory for the corridor function is restricted; in contrast, a route guidance function of the navigation device is required as much as possible not to be restricted. FIG. 13 shows on a map a route 131 selected based on the user's operation. FIG. 14 shows minimum units of the map data overlaid on the map. The minimum units are distinguished from each other by dotted lines in FIG. 14. As shown in FIG. 14, the clipped part 132 extends almost along the route 131.

In this case, however, an alternative route the navigation device can re-retrieve may be similar to the original route 131. The navigation device therefore cannot re-retrieve a possible optimum route that is significantly different from the original route 131. For example, as shown in FIG. 15, the navigation device can use only path D-E-I and N-O-R in calculating an alternative route in place of the original route 131. The alternative route to be calculated will be inevitably almost the same as the original route 131. In addition, the navigation device cannot display a detailed map corresponding to map data which is not included in the memory for the corridor function.

Patent Document 1: JP-H2-151715 A (JP-2663003 B)

SUMMARY OF THE INVENTION

It is therefore an object of the present invention to provide a map display device having a corridor function that capable of helping solving the above problem.

To achieve the above object, a map display device having a corridor function is provided with the following: A control unit is included for clipping a part of map data corresponding to a region, which includes a reference point at a central part of the region, and for storing the part of map data in a memory; and a display unit is included for displaying a map of the region based on the part of map data stored in the memory.

Under the above structure, the control unit clips a part of map data corresponding to a region including a reference position at a central part of the region; therefore, a map display function can be effectively performed under a condition where a space of the memory for the corridor function is limited.

BRIEF DESCRIPTION OF THE DRAWINGS

The invention, together with additional objective, features and advantages thereof, will be best understood from the following description, the appended claims and the accompanying drawings. In the drawings:

DETAILED DESCRIPTION OF THE EMBODIMENTS

First Embodiment

Figure 1:
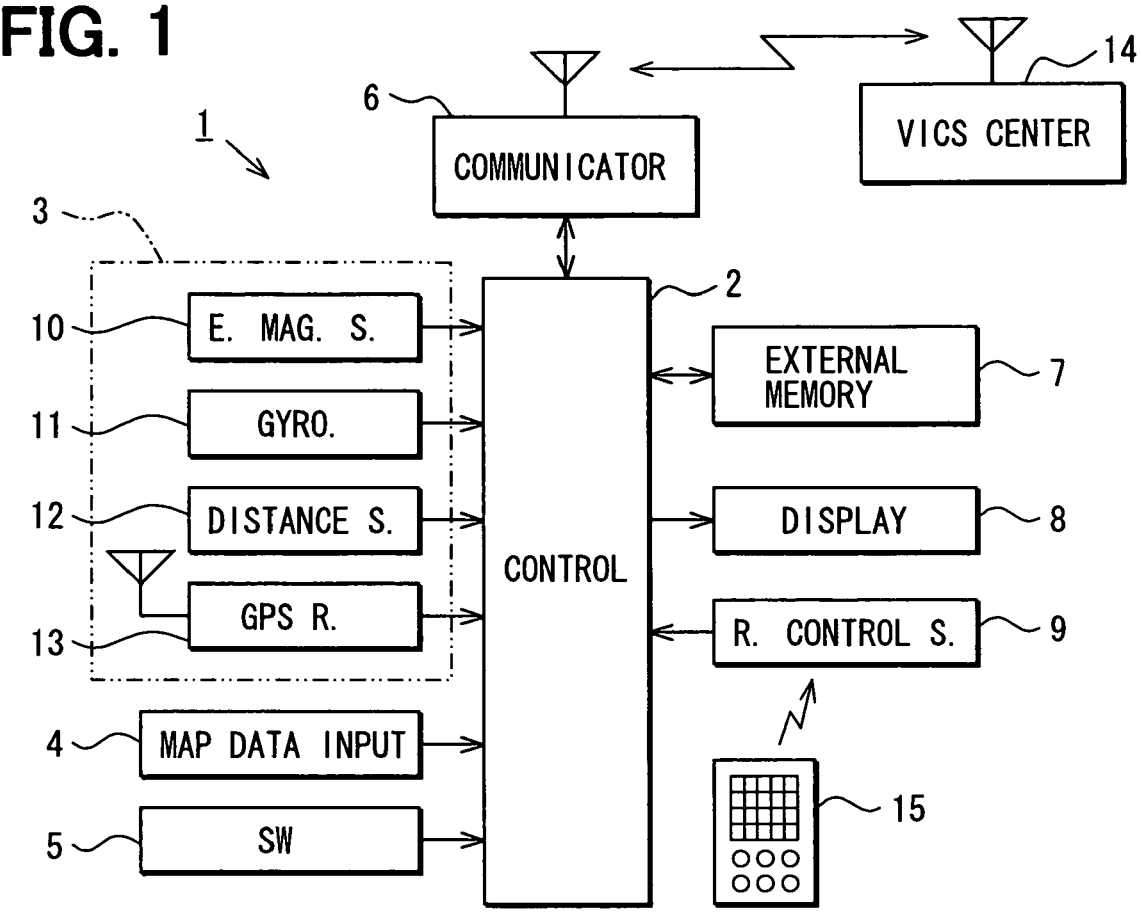
FIG. 1 is a block diagram showing a navigation device for a vehicle according to a first embodiment of the present invention.

Hereinafter, a navigation device for a vehicle according to a first embodiment of the present invention is described with reference to FIGS. 1 to 8. As shown in FIG. 1, the navigation device provided in a vehicle includes a control circuit 2, a position detector 3, a map data output device 4, operation switches 5, a communicator 6, an external memory 7, a display device 8, and a remote control sensor 9.

The control circuit 2 as a control unit is for controlling an overall operation of the navigation device 1 and includes a CPU (not shown), a ROM (not shown), a RAM (not shown), and an I/O (not shown) which are connected with each other through bus lines (not shown). The control circuit 2 executes a corridor function. The RAM includes a memory for the corridor function. The memory for the corridor function is hereinafter referred to as a corridor memory.

The position detector 3 includes an earth magnetism sensor 10, a gyroscope 11, a distance sensor 12, and a GPS (Global Positioning System) receiver 13. The position detector 3 detects with a high accuracy a current position of the vehicle by using the sensors 10 to 13 in a mutually complementary style. The position detector 3 may include only one or more of the sensors 10 to 13 depending on a required detection accuracy. The position detector 3 may also include a steering sensor detecting a rotation angle of the steering wheel and a wheel sensor detecting rotation speeds of tire wheels.

The map data output device 4 includes a data reading device which reads data in a storage device such as a CD-ROM, a DVD-ROM, an HDD, or a flash memory. The map data output device 4 outputs to the control circuit 2 the read data such as map data, data for map matching, mark data, or dictionary data for voice recognition. The operation switches 5 include touch switches (not shown) or a touch panel (not shown) on a display screen of the display device 8 and also include a mechanical push switches (not shown) around the display screen.

A VICS (Vehicle Information and Communication System) communicator, a cell phone for general use, or a cell phone dedicated for combination use with the control circuit 2 may serve as the communicator 6. Through the communicator 6, the control circuit 2 can exchange data with an external information center such as a VICS center 14. The external memory 7 includes a data reading device which reads data in a storage device such as a memory stick, a memory card, and a magnetic tape. The communicator 6 outputs to the control circuit 2 the read data such as map data, music data, or image data.

The display device 8 includes, for example, a color liquid crystal display and displays together the map data (including road data, character, and background image data, etc), a current position mark, and supplemental information such as a recommended route.

The remote control sensor 9 receives from a remote controller 15 a signal indicating a user's operation to the remote controller 15, and outputs the received signal to the control circuit 2.

The control circuit 2 has a route calculation function which calculates, for example in the Dijkstra method, an optimum route for the recommended route from a current position (or a starting position) to a destination. The control circuit 2 determines the destination based on the user's operation to the operation switches 5 or the remote controller 15.

The control circuit 2 causes the display device 8 to display the recommended route on a map and further executes a map matching process which determines the current position on the map. The control circuit 2 is connected with an audio device (not shown) and controls the audio device.

Hereinafter, the operation of the navigation device 1 will be described with reference to FIGS. 2 to 8, mainly focusing on a corridor function in which the control circuit 2 clips a part of the map data received from the map data output device 4 and stores the clipped part of the map in the corridor memory. In this embodiment, the part of the map data to be clipped and stored corresponds to a region including and surrounding a reference position such as the current position of the vehicle. The reference position is at a central part of the region. Subsequently at Step S20, the control circuit 2 reads a part of the map data corresponding to the region.

Figure 2:
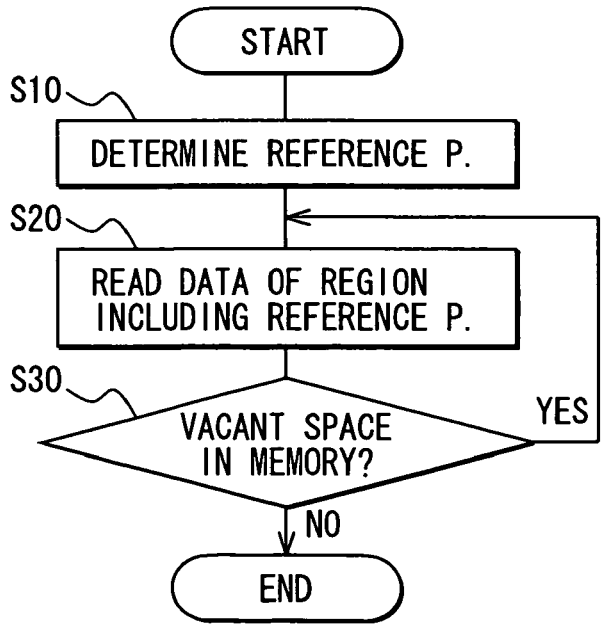
FIG. 2 is a flowchart showing an operation of the navigation device.

For example, as shown in FIG. 2, the control circuit 2 determines at Step S10 the reference position to be the current position of the vehicle. Subsequently at Step S20, the control circuit 2 reads a part of the map data corresponding to a region (hereinafter referred to as a corridor region) including the reference position at a central part of the region. The control circuit 2 then stores at Step S20 the part of the map data into the corridor memory. The control circuit 2 then determines at Step S30 whether the corridor memory has a vacant space.

When the corridor memory has the vacant space, the control circuit 2 returns to Step S20 to read another part of the map data and to store it in the corridor memory.

When the control circuit 2 determines at Step S30 that the corridor memory has no vacant space, it ends the operation for the corridor function. As a result, the control circuit 2 step by step enlarges the corridor region, by repeatedly reading a part of the map data and by repeatedly storing the part in the corridor memory, until the corridor memory becomes full.

Figure 3:
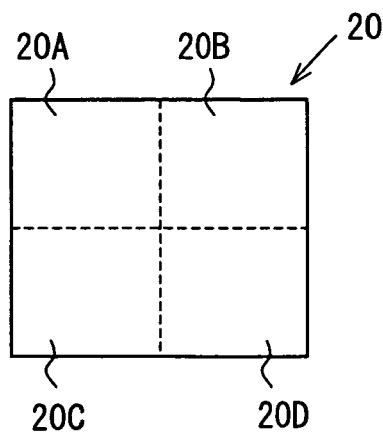
FIG. 3 is a schematic view of a minimum unit divided into four sections lengthwise and breadthwise.

Hereinafter, four methods for enlarging the corridor region will be described with reference to FIGS. 4 to 7. A minimum unit 20 is defined as the smallest unit of map data to be clipped. The minimum unit 20 is equally divided lengthwise and breadthwise into four sections 20A to 20D by the control circuit 2, as shown in FIG. 3. In enlarging the corridor region, one of four methods is chosen depending on which section 20A, 20B, 20C, or 20D a current position as a reference position is located in.

The control circuit 2 is designed to choose one of the four methods in this manner, so that the current position remains close to the center of the enlarged corridor region, that is, so that the current position remains in a central part of the enlarged corridor region.

Figure 4:
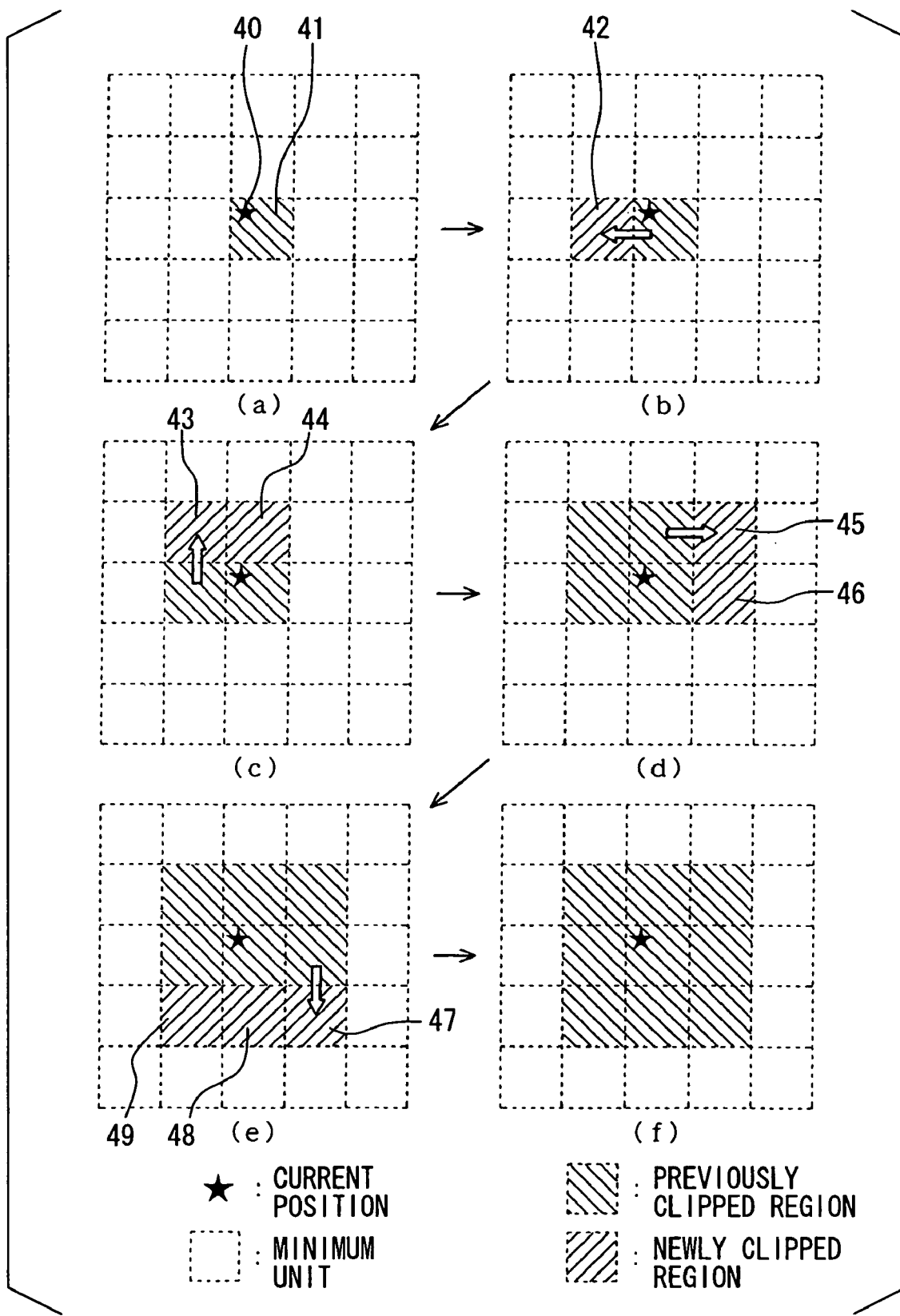
FIG. 4 is a schematic view showing a first method to enlarge a region including a current position.

For example, when the current position is in the top left section 20A, the control circuit 2 enlarges the corridor region in the first pattern shown in FIG. 4. When the current position is in the top right section 20B, the control circuit 2 enlarges the corridor region in the second pattern shown in FIG. 5. When the current position is in the bottom left section 20C, the control circuit 2 enlarges the corridor region in the third pattern shown in FIG. 6. When the current position is in the bottom right section 20D, the control circuit 2 enlarges the corridor region in the fourth pattern shown in FIG. 7.

In the first pattern, as shown in (a) in FIG. 4, the current position (or a reference position) shown by a star mark 40 is in the top left section of a minimum unit 41. The control circuit 2 hence clips, as shown in (b) in FIG. 4, a minimum unit 42 which is located just to the left of the minimum unit 41. The control circuit 2 then clips, as shown in (c) in FIG. 4, two minimum units 43 and 44 which are located just above the minimum units 42 and 41 respectively. The control circuit 2 then clips, as shown in (d) in FIG. 4, two minimum units 45 and 46 which are located just to the right of the corridor region already clipped.

The control circuit 2 then clips, as shown in (e) in FIG. 4, three minimum units 47, 48 and 49 which are located just below the corridor region already clipped. The control circuit 2 further enlarges step by step in a similar manner the corridor region until the corridor memory becomes full. For instance, when the corridor memory becomes full of data after the corridor region is enlarged to have nine minimum units, the control circuit 2 stops enlarging the corridor region in a state shown in (f) in FIG. 4.

Figure 5:
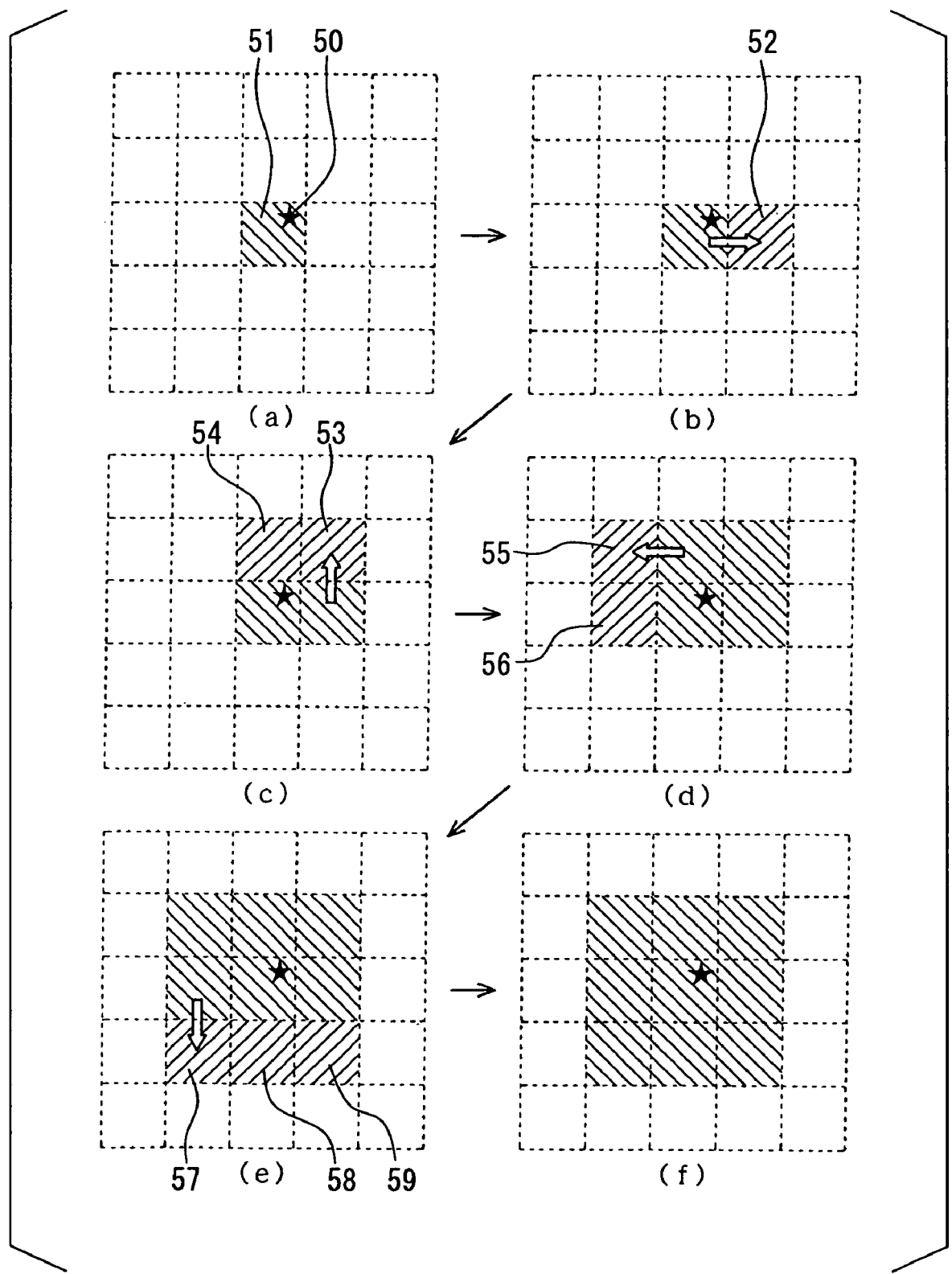
FIG. 5 is a schematic view showing a second method to enlarge a region including a current position.

In the second pattern, as shown in (a) in FIG. 5, the current position (or a reference position) shown by a star mark 50 is in the top right section of a minimum unit 51. The control circuit 2 hence clips, as shown in (b) in FIG. 5, a minimum unit 52 which is located just to the right of the minimum unit 51. The control circuit 2 then clips, as shown in (c) in FIG. 5, two minimum units 53 and 54 which are located just above the minimum units 52 and 51 respectively. The control circuit 2 then clips, as shown in (d) in FIG. 5, two minimum units 55 and 56 which are located just to the left of the corridor region already clipped.

The control circuit 2 then clips, as shown in (e) in FIG. 5, three minimum units 57, 58 and 59 which are located just below the corridor region already clipped. The control circuit 2 further enlarges step by step in a similar manner the corridor region until the corridor memory becomes full. For instance, when the corridor memory becomes full of data after the corridor region is enlarged to have nine minimum units, the control circuit 2 stops enlarging the corridor region in a state shown in (f) in FIG. 5.

Figure 6:
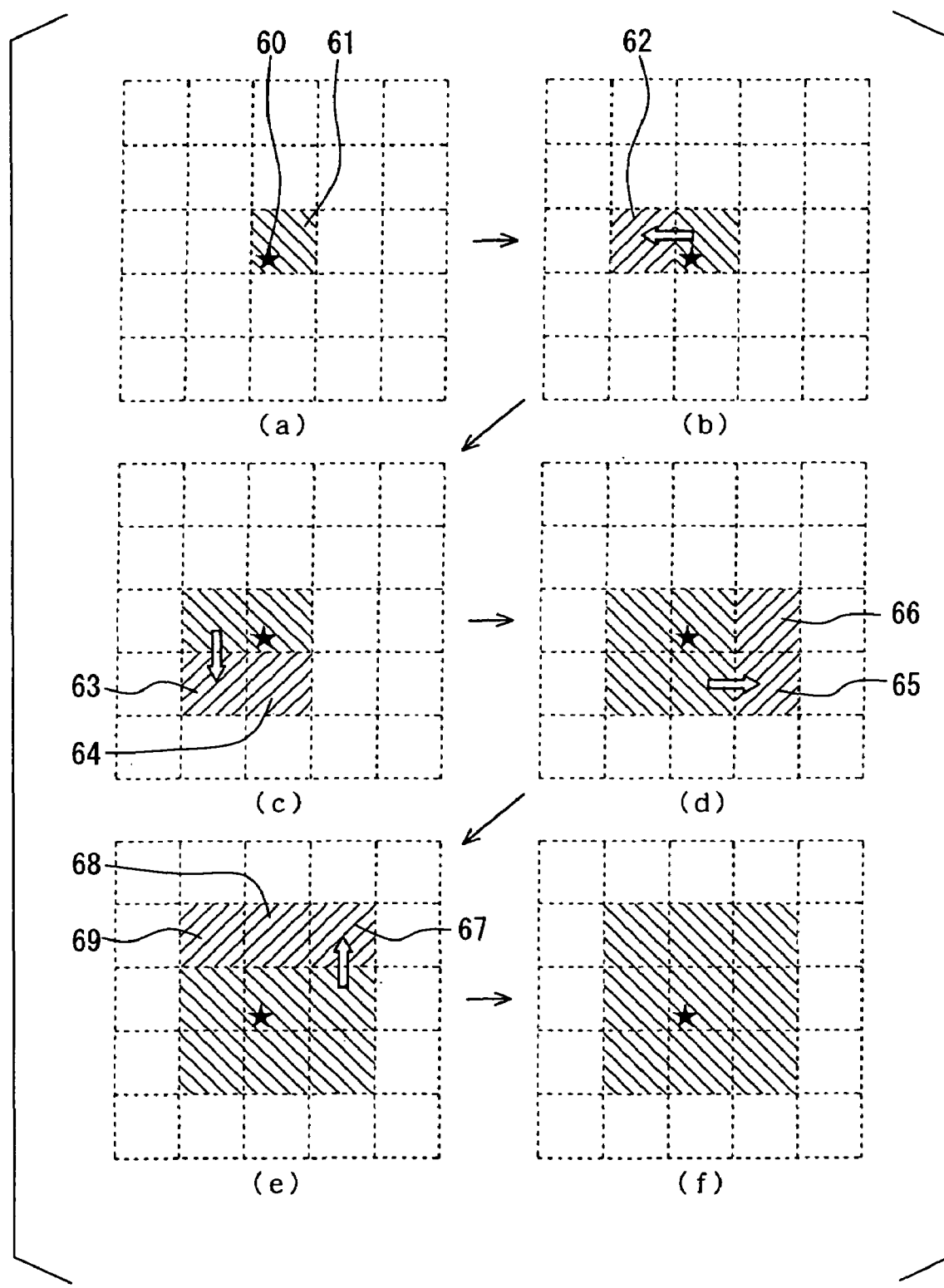
FIG. 6 is a schematic view showing a third method to enlarge a region including a current position.

In the third pattern, as shown in (a) in FIG. 6, the current position (or a reference position) shown by a star mark 60 is in the bottom left section of a minimum unit 61. The control circuit 2 hence clips, as shown in (b) in FIG. 6, a minimum unit 62 which is located just to the left of the minimum unit 61. The control circuit 2 then clips, as shown in (c) in FIG. 6, two minimum units 63 and 64 which are located just below the minimum units 62 and 61 respectively. The control circuit 2 then clips, as shown in (d) in FIG. 6, two minimum units 65 and 66 which are located just to the right of the corridor region already clipped.

The control circuit 2 then clips, as shown in (e) in FIG. 6, three minimum units 67, 68 and 69 which are located just above the corridor region already clipped. The control circuit 2 further enlarges the corridor region step by step in a similar manner until the corridor memory becomes full. For instance, when the corridor memory becomes full of data after the corridor region is enlarged to have nine minimum units, the control circuit 2 stops enlarging the corridor region in a state shown in (f) in FIG. 6.

Figure 7:
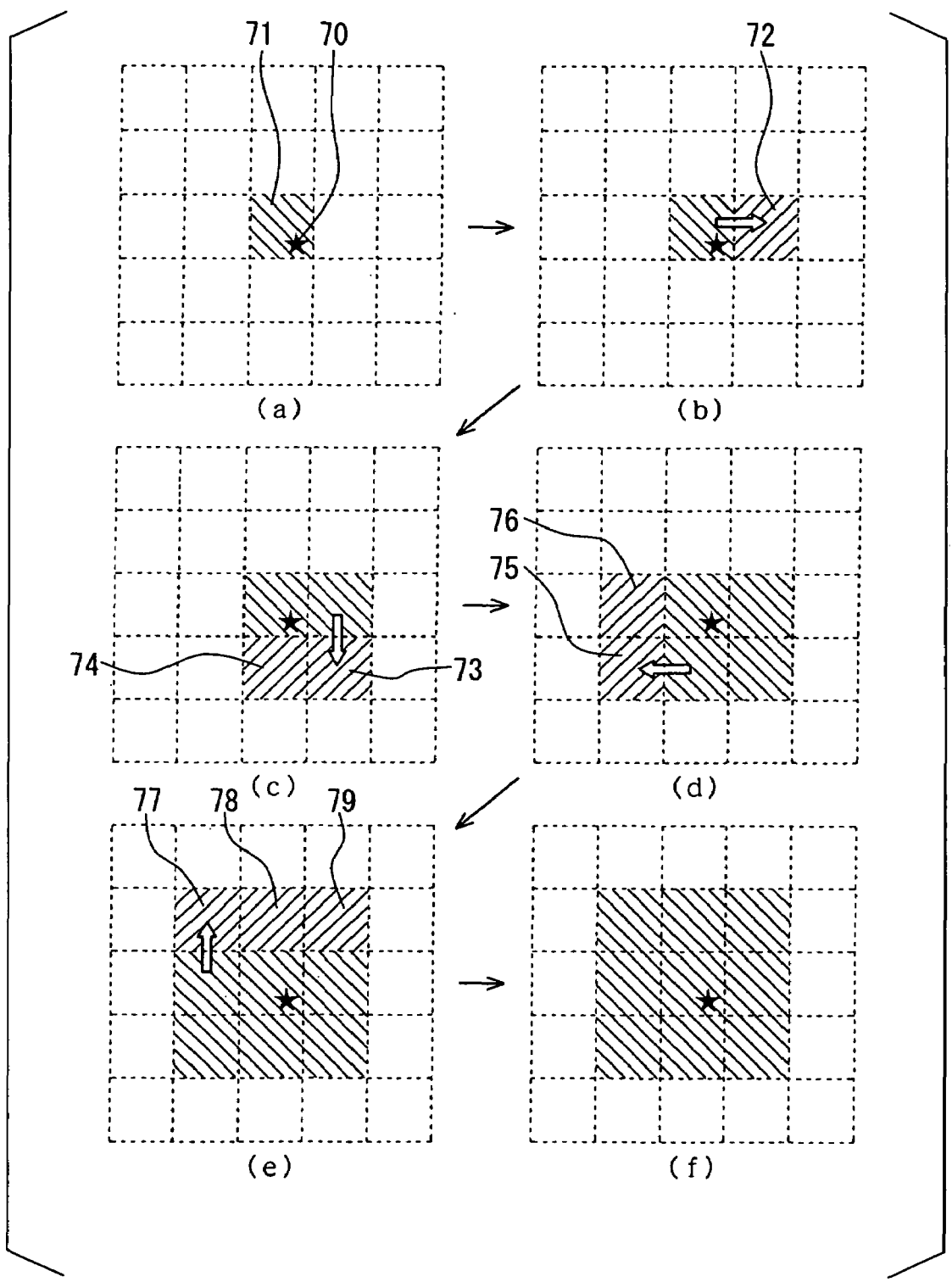
FIG. 7 is a schematic view showing a fourth method to enlarge a region including a current position.

In the fourth pattern, as shown in (a) in FIG. 7, the current position (or a reference position) shown by a star mark 70 is in the bottom right section of a minimum unit 71. The control circuit 2 hence clips, as shown in (b) in FIG. 7, a minimum unit 72 which is located just to the right of the minimum unit 71. The control circuit 2 then clips, as shown in (c) in FIG. 7, two minimum units 73 and 74 which are located just below the minimum units 72 and 71 respectively. The control circuit 2 then clips, as shown in (d) in FIG. 7, two minimum units 75 and 76 which are located just to the left of the corridor region already clipped.

The control circuit 2 then clips, as shown in (e) in FIG. 7, three minimum units 77, 78 and 79 which are located just above the corridor region already clipped. The control circuit 2 further enlarges step by step in a similar manner the corridor region until the corridor memory becomes full. For instance, when the corridor memory becomes full of data after the corridor region is enlarged to have nine minimum units, the control circuit 2 stops enlarging the corridor region in a state shown in (f) in FIG. 7.

Figure 8:
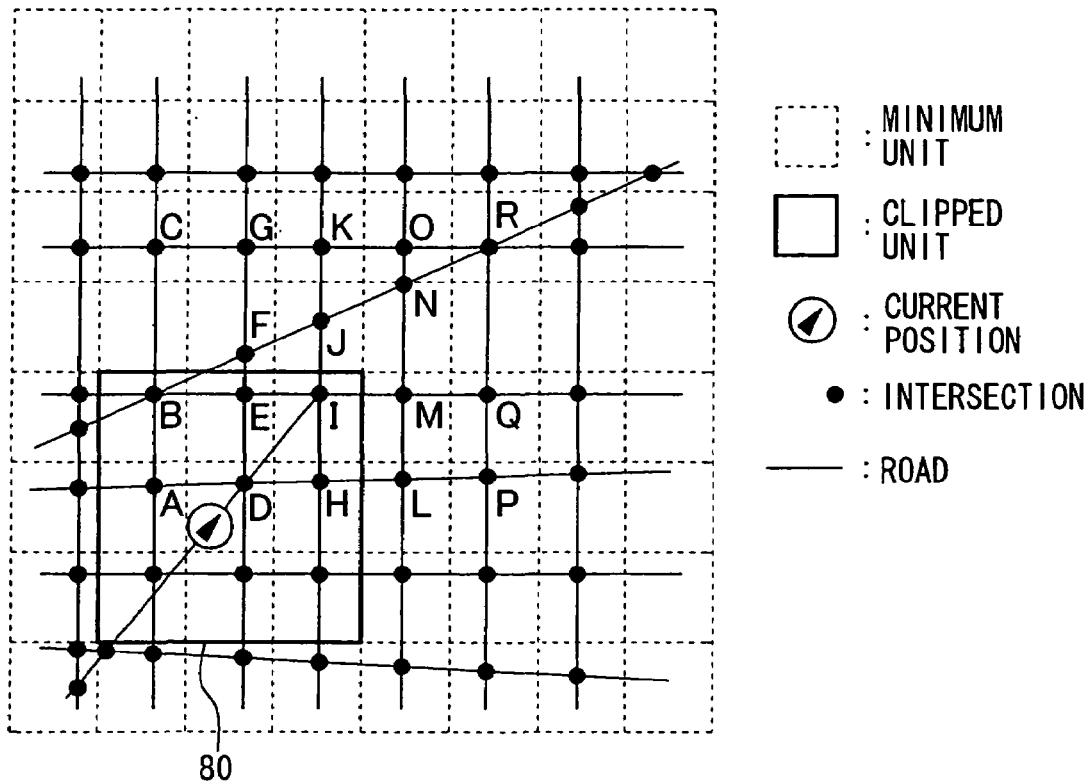
FIG. 8 is a schematic view showing a relation between a clipped part of map data and a part of map data surrounding the clipped part.

In FIG. 8, a group 80 of the nine minimum units including the current position is stored in the corridor memory as the corridor region. In a practical situation, the corridor memory is so large in amount that a huge number of minimum units around the current position are clipped and stored in the corridor memory.

The navigation device 1 of the first embodiment thus clips and stores in the corridor memory a part of the map data in the corridor region including a predetermined reference position (e.g., the current position) at a central part of the part. A navigation function (e.g., a route guidance function) of the control circuit 2 therefore is not exceedingly restricted. In fact, the control circuit 2 can calculate and retrieve a recommended route from the current position to a destination which is located in any direction from the current position.

Moreover, control circuit 2 is designed to choose one of the four methods so that the current position remains close to the center of the enlarged corridor region. The current position therefore remains close to the center of the corridor region irrespective of the section of the current position in a minimum unit. This feature becomes more effective in the case that the corridor memory is not large enough to clip a huge amount of the minimum units. The control circuit 2 thus can have many options for alternative routes to calculate in place of an original recommended route even in this case.

Second Embodiment

Figure 9:
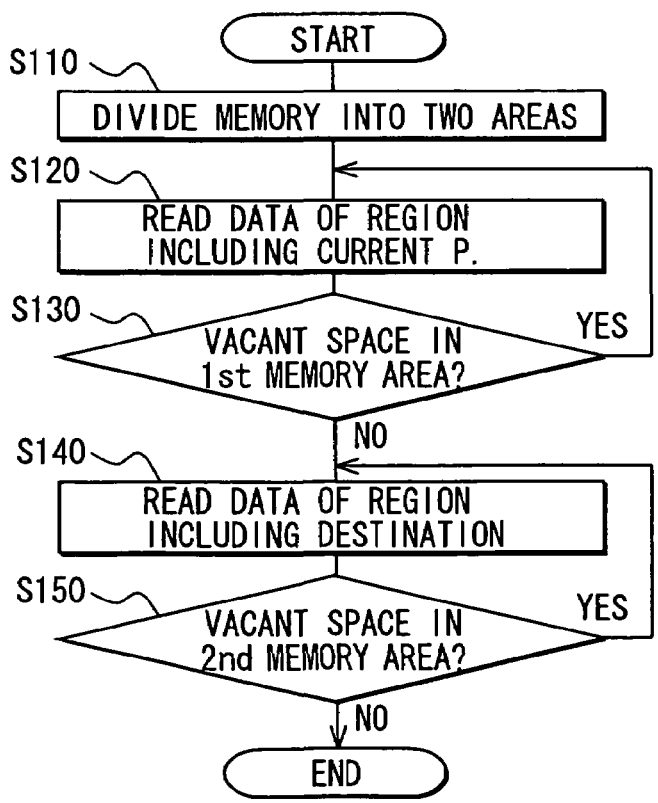
FIG. 9 is a flowchart showing an operation of a navigation device according to a second embodiment of the present invention.

Hereinafter, a navigation device 1 according to a second embodiment of the present invention will be described with reference to FIGS. 9 and 10. A hardware configuration of the navigation device 1 of the second embodiment is the same as that of the first embodiment. The difference between operations in the first embodiment and the second embodiment is that the navigation device 1 of the second embodiment determines multiple predetermined positions as reference positions and clips respective parts of the map data including and surrounding the respective reference positions. The reference positions are, for example, a current position and a destination. For example, the control circuit 2 equally divides at Step S110 in FIG. 9 the corridor memory into two logical memory areas. One of the memory areas is for storing the part of the map data including the current position at its central part and is referred to as the first memory area. The other one of the memory areas is a memory area for storing the part of the map data including the destination at its central part and is referred to as the second memory area. Subsequently at Step S120, the control circuit 2 reads a part of the map data corresponding to a region (hereinafter referred to as the first corridor region) including and surrounding the current position, and stores the part in the first memory area. Subsequently at Step S130, the control circuit 2 determines whether the first memory area has a vacant space. When the first memory area has the vacant space, the control circuit 2 returns to Step S120 to read another part of the map data surrounding the current position and to store it in the first memory area. When the first memory area has no vacant space, the control circuit 2 executes Step S140. The control circuit 2 thus enlarges step by step the first corridor region by repeatedly reading a part of the map data corresponding to the enlarged first corridor region, and by repeatedly storing the part in the first memory area, until the first memory area becomes full. Methods to enlarge the first corridor region are the same as the methods to enlarge the corridor region in the first embodiment, which are shown in FIGS. 3 to 7.

At Step S140, the control circuit 2 reads a part of the map data corresponding to a region (hereinafter referred to as the second corridor region) including and surrounding the destination, and stores the part in the second memory area. Subsequently at Step S150, the control circuit 2 determines whether the second memory area has a vacant space.

When the second memory area has the vacant space, the control circuit 2 returns to Step S140 to read additional part of the map data surrounding the destination and to store it in the second memory area.

When the control circuit 2 determines at Step S150 that the corridor memory has no vacant space in the second memory area, it ends the operation for the corridor function. The control circuit 2 thus enlarges step by step the second corridor region by repeatedly reading a part of the map data corresponding to the enlarged second corridor region and by repeatedly storing the part in the second memory area. Methods to enlarge the second corridor region are the same as the methods to enlarge the corridor region in the first embodiment, which are shown in FIGS. 3 to 7.

Figure 10:
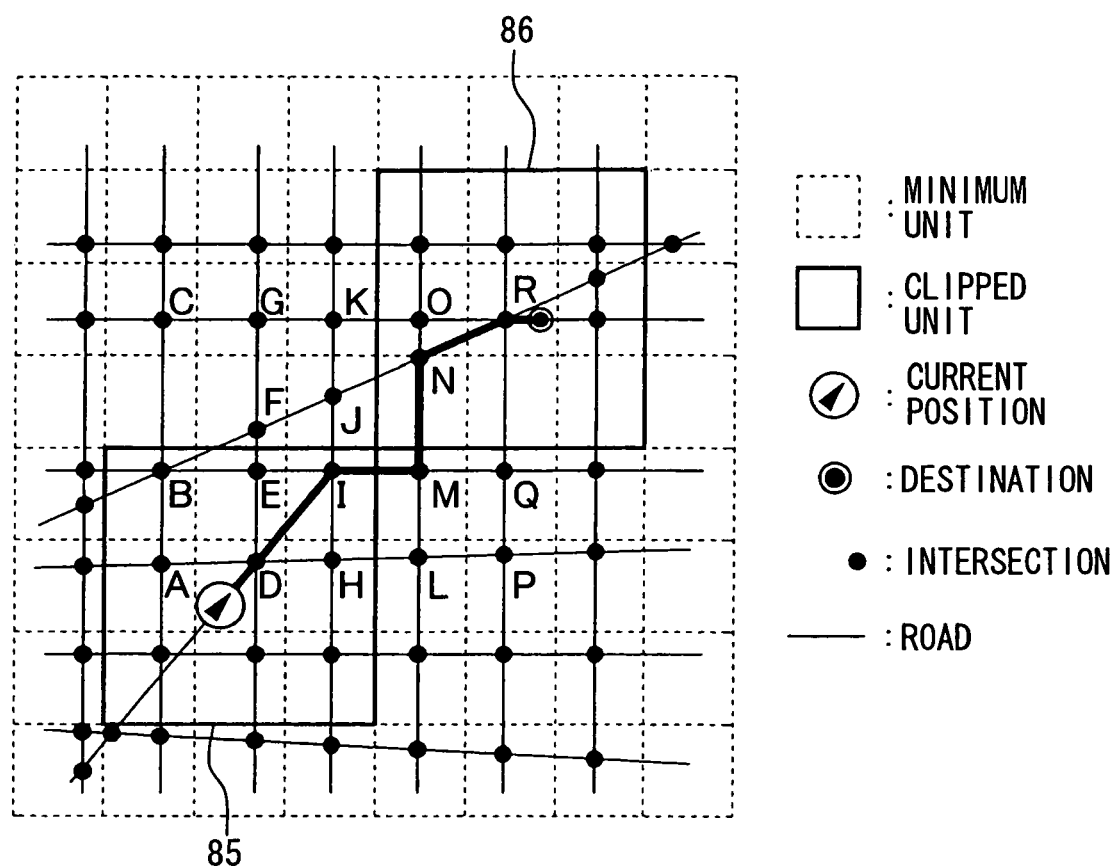
FIG. 10 is a schematic view showing a relation in the second embodiment between a clipped part of map data and a part of map data surrounding the clipped part.

FIG. 10 shows a situation where the control circuit 2 has stored nine minimum units in the first memory area and further stored nine minimum units in the second memory area.

As shown in FIG. 10, a group 85 of nine minimum units including the current position at its central part is stored in the first memory area as the first corridor region. In addition, a group 86 of nine minimum units including the destination at its central part is stored in the second memory area as the second corridor region. In a practical situation, the corridor memory is so large in amount that a huge number of minimum units around the current position and the destination are clipped and stored in the corridor memory.

The navigation device 1 of the second embodiment thus clips and stores in the corridor memory a part of the map data in the first and second corridor regions respectively including predetermined reference positions (e.g., current position and destination) at their respective central parts. A navigation function (e.g., a route guidance function) of the control circuit 2 therefore is not exceedingly restricted. In particular, the control circuit 2 can calculate and retrieve, with less restriction, a new recommended route different from a current recommended route.

Third Embodiment

Hereinafter, a navigation device 1 according to a third embodiment of the present invention will be described with reference to FIG. 11. A hardware configuration of the navigation device 1 of the third embodiment is the same as that of the first embodiment. The difference between operations in the first embodiment and the third embodiment is that the navigation device 1 of the third embodiment determines a method for enlarging a corridor region based on a direction from the current position to the destination.

Figure 11:
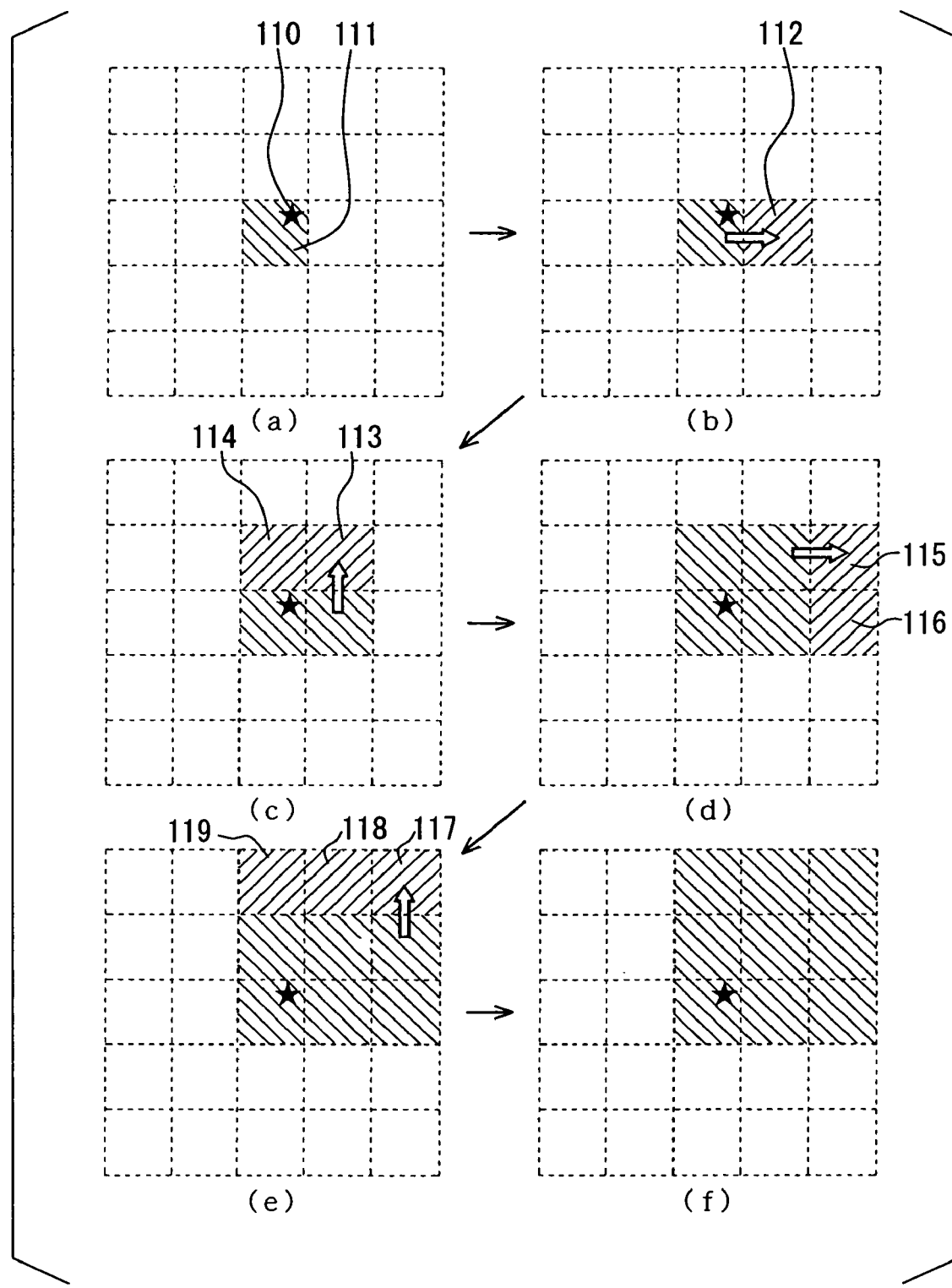
FIG. 11 is a schematic view showing a method in a third embodiment of the present invention to enlarge a region including a current position.

For example, in the case that the destination is located in the upper right direction in the FIG. 11 from a current position 110 in a minimum unit 111, the control circuit 2 enlarges the corridor region in a pattern shown in (a) to (f) in FIG. 11, irrespective of which section of the four sections within a minimum unit the current position 110 is located in.

In this pattern, as shown in (a) and (b) in FIG. 11, the control circuit 2 clips a minimum unit 112 which is located just to the right of the minimum unit 111 to which the current position belongs.

The control circuit 2 then clips, as shown in (c) in FIG. 11, two minimum units 113 and 114 which are located just above the minimum units 112 and 111 respectively. The control circuit 2 then clips, as shown in (d) in FIG. 11, two minimum units 115 and 116 which are located just to the right of the corridor region already clipped.

The control circuit 2 then clips, as shown in (e) in FIG. 11, three minimum units 117, 118 and 119 which are located just above the corridor region already clipped. The control circuit 2 further enlarges step by step in a similar manner the corridor region until the corridor memory becomes full of data. For instance, when the corridor memory becomes full of data after the corridor region is enlarged to have nine minimum units, the control circuit 2 stops enlarging the corridor region in a state shown in (f) in FIG. 11. In the case that the destination is located in a direction different from that in FIG. 11, the control circuit 2 enlarges the corridor region so that the corridor region extends from the current position to the different destination.

The navigation device 1 of the third embodiment has almost the same effect with the navigation device 1 of the first embodiment. In particular, the control circuit 2 can calculate and retrieve, with far less restriction, a new recommended route different from a current recommended route, because it enlarges the corridor region according to a direction from the current position to the destination.

Furthermore, in this embodiment, a modified method can be adopted. Namely, with reference to FIG. 11, clipping minimum units 111 to 114 ((c) in FIG. 11) is performed in the same method as that of the first embodiment until a given region (in this case, four minimum units in (C) in FIG. 11) is clipped; then the given region is enlarged while considering a direction from the current position to the destination as shown in (d) to (f) in FIG. 11.

Fourth Embodiment

Figure 12:
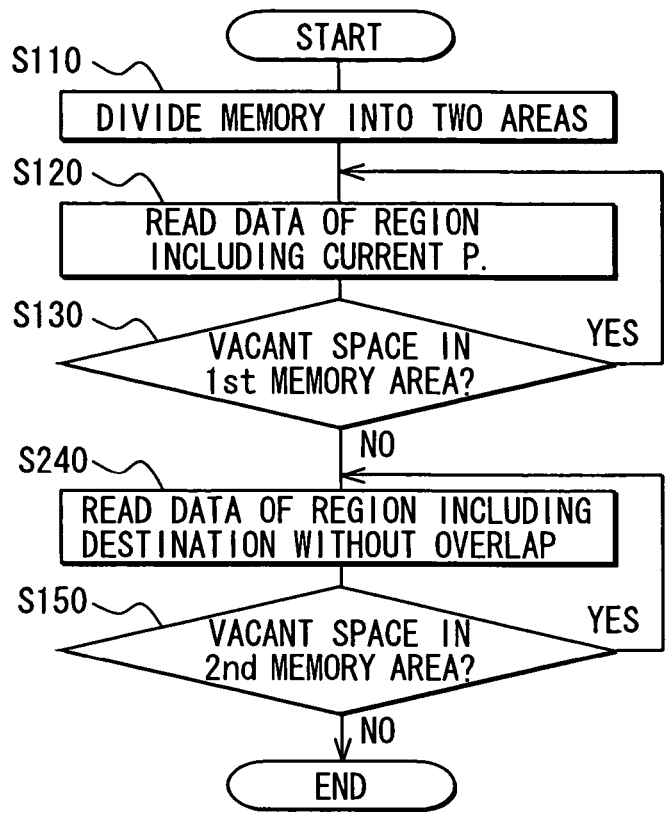
FIG. 12 is a schematic view showing a method in a fourth embodiment of the present invention to enlarge a region including a current position.
Figure 13:
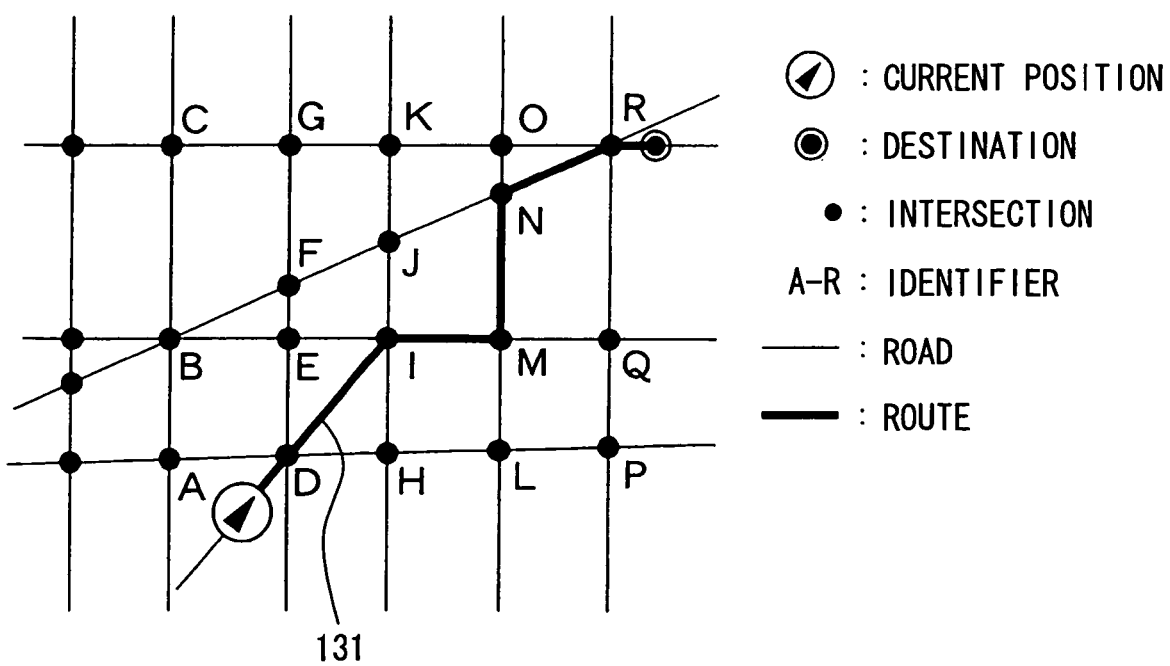
FIG. 13 is a schematic view showing a route on a map in a prior art.
Figure 14:
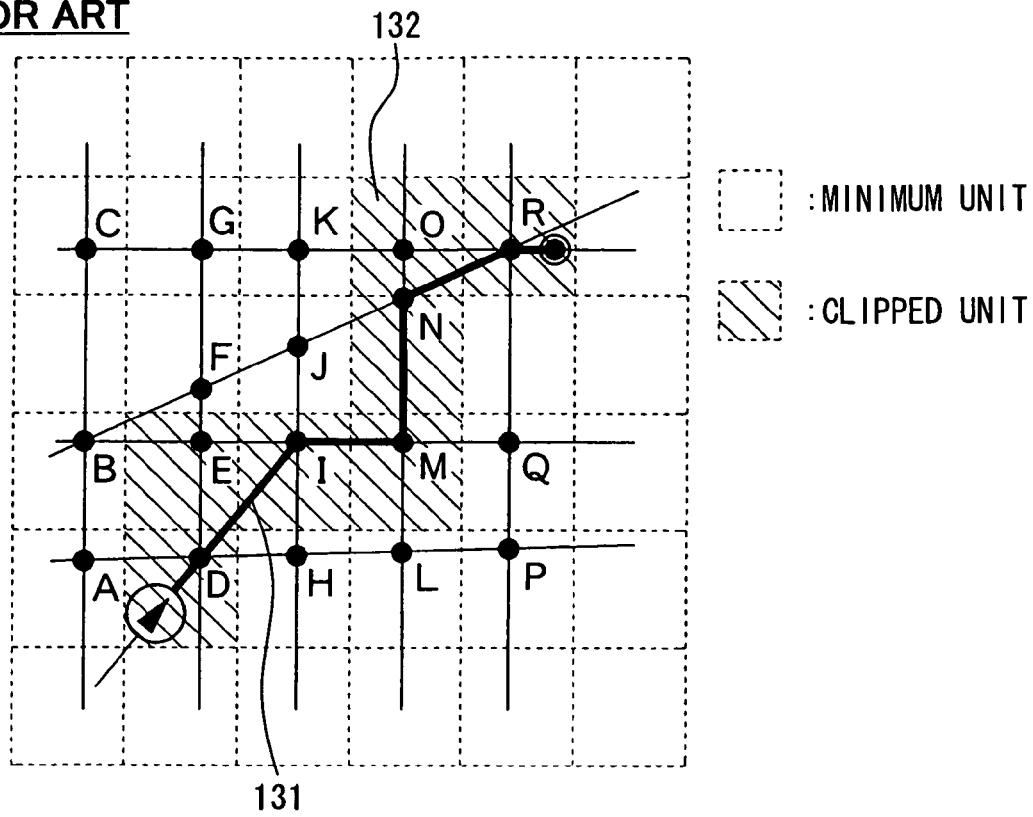
FIG. 14 is a schematic view showing a relation between a clipped part of map data and a part of map data surrounding the clipped part in the prior art.
Figure 15:
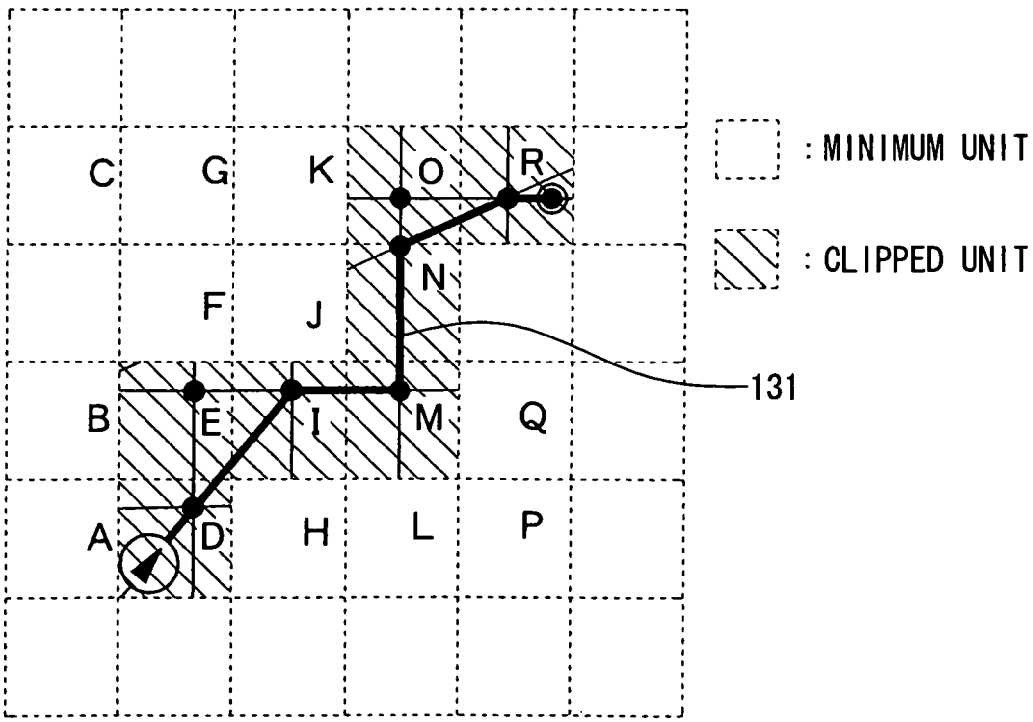
FIG. 15 is a schematic view mainly showing a map based on the clipped part in the prior art.

Hereinafter, a navigation device 1 according to a fourth embodiment of the present invention will be described with reference to FIG. 12. A hardware configuration of the navigation device 1 of the fourth embodiment is the same as that of the second embodiment. The difference between operations in the second embodiment and the fourth embodiment is that the navigation device 1 of the fourth embodiment enlarges the first and second corridor regions while avoiding overlap between the two regions.

In Steps S110 to S130, the control circuit 2 operates in the same manner as Steps S110 to S130 in the second embodiment. For example, the control circuit 2 equally divides the corridor memory into the first and second memory areas, reads the first corridor region of the map data including the current position at its central part, and stores the part in the first memory area until the first memory area becomes full.

Subsequently in Step S240, the control circuit 2 reads the second corridor region of the map data including destination at its central part and stores the part in the second memory area. In enlarging the second corridor region, the control circuit 2 discards from the enlarged second corridor region an area which already belongs to the enlarged first corridor region. The first corridor region and the second corridor region therefore do not overlap each other.

Then the control circuit 2 determines at Step S150 whether the second memory area has a vacant space. When the second memory area has the vacant space, the control circuit 2 returns to Step S240 to read additional part of the map data surrounding the destination and to store it in the second memory area.

When the control circuit 2 determines at Step S150 that the corridor memory has no vacant space, it ends the operation for the corridor function.

The navigation device 1 of the fourth embodiment has almost the same effect with the navigation device 1 of the second embodiment. In addition, two regions each including at its central part a reference position (e.g., current position, destination) are enlarged without overlap. The corridor memory is therefore used with more efficiency and is capable of storing larger information, for example in the case that the two reference positions are located closely to each other.

The present invention should not be limited to the embodiment discussed above and shown in the figures, but may be implemented in various ways without departing from the spirit of the invention.

For example, in the situation shown by FIG. 10, the recommended route has been already calculated and displayed after the current position and destination are designated. However, the control circuit 2 may clip parts of the map data and store the parts to the corridor memory after designating the current position and the destination but before calculating the recommended route.

The navigation device 1 may clip and store in the corridor memory more than two parts of the map data corresponding to more than two reference positions. For instance, a stop-off point, or a midway position between a current position and a destination, can be included in the reference positions in addition to the current position and the destination. In the case that the navigation device 1 clips three parts of the map data corresponding to three reference positions, the corridor memory may be evenly divided into three in which the three parts are stored respectively.

The corridor memory can be divided unevenly into two or more parts. In this case, the control circuit 2 may change sizes of the parts based on individual attributes of the corresponding reference positions. For example, a memory area for storing a given part corresponding to a given reference position can be set to a relatively small size, when the given reference position has an attribute such as a highway or rest area within a highway. This is because a possible re-calculated recommended route around the given reference position tends to remain unchanged and hence it is unnecessary to give a large memory area to the given part. In contrast, if the given reference position has an attribute possibly involving various re-calculated routes in a route re-retrieval, the corresponding memory area may be set to a relatively large size.

The control circuit 2 may change the sizes of the parts based on densities of information in the individual parts of the map data. For example, a memory area corresponding to a big city can be set to a relatively large size. In contrast, a memory area corresponding to countryside can be set to a relatively small size.

In the above embodiments, the control circuit 2 clips the minimum units arranged in a line adjacent to (e.g., just to the left of, just to the right of, just above, and just below) a side of the corridor region already clipped. However, the control circuit 2 may enlarge the corridor region by clipping several minimum units arranged along a closed loop just surrounding the corridor region already clipped. The control circuit 2 may also clip one by one a single minimum unit adjacent to a side of the corridor region already clipped.

In the fourth embodiment, the control circuit 2 may first clip a part of the map data including and surrounding the destination (i.e., the second corridor region) and then enlarge another part of the map data including and surrounding the current position (i.e., the first corridor region) while avoiding overlap between the two parts.

In the fourth embodiment, the control circuit 2 may clip more than two parts of the map data corresponding to three respective reference positions so that the three parts do not overlap each other.

In the second and fourth embodiments, the control circuit 2 may also clip map data for a wide area and stores the map data in the corridor memory, when the first corridor region is not in touch with the second corridor region or when the first and second corridor region are located far apart from each other. In this case, the control circuit 2 can appropriately calculate routes between the first and second corridor region.

In the case that the two reference positions are the current position and the destination which are close to each other, the control circuit 2 may clip and store in the corridor memory a part of the map data including, at a central part of the part, a point at midway between the current position and the destination.

The operations of the navigation device 1 described above can be made by a device for displaying a map which does not execute route guidance.

Individual processing or execution explained in the above embodiment, e.g., using the flowchart can be constructed as a unit or means in a program stored in the ROM or the like and executed by using the CPU or the like.

It will be obvious to those skilled in the art that various changes may be made in the above-described embodiments of the present invention. However, the scope of the present invention should be determined by the following claims.

What is claimed is:

1. A map display device having a corridor function for partially clipping map data, that map data including a plurality of minimum units, the minimum unit being defined as a smallest unit to be clipped from the map data, the device comprising:

a control unit configured to
specify one of the minimum units of the map data, the one of the minimum units including a reference position;
define four sections within the specified one of the minimum units by evenly dividing the specified one of the minimum units lengthwise and breadthwise;
specify one of the four sections within the specified one of the minimum units, the specified one of the four sections including the reference position;
determine a sequence of enlarging a region to be clipped based on the specified one of the four sections, the region including the reference position at a central part of the region;
clip a part of the map data corresponding to the region; and
store the clipped part of the map data in a memory; and
a display unit configured to display a map of the region based on the clipped part of the map data.

2. The map display device according to claim 1, wherein the four sections in each of the minimum units include (i) top right, (ii) top left, (iii) bottom right, and (iv) bottom left.

3. The map display device according to claim 1, wherein the reference position includes a current position of a vehicle where the map display device is provided.

4. The map display device according to claim 1, further comprising enlarging the region by clipping a single minimum unit of map data at a time.

5. The map display device according to claim 1, further comprising enlarging the region clipping, at a time, minimum units of map data arranged in a closed loop just surrounding an already clipped part of map data.

6. The map display device according to claim 1, wherein after the part of map data corresponding to the region including the reference position at the central part of the region is clipped, the region is enlarged based on a direction from a current position of a vehicle where the map display device is provided and a destination of the vehicle.

7. The map display device according to claim 1, wherein the reference position is one of a plurality of reference positions, wherein:

the control unit clips a part of map data corresponding to a region, which includes each of the plurality of reference points at a central part of the region, and stores the part of map data in the memory; and the display unit displays a map of the region, which includes the each of the plurality of reference positions, based on the part of map data stored in the memory.

8. The map display device according to claim 7, wherein the plurality of reference positions include a current position of a vehicle where the map display device is provided and a destination of the vehicle.

9. The map display device according to claim 7, wherein the memory is evenly divided into a plurality of memory areas corresponding to the plurality of reference positions, respectively.

10. The map display device according to claim 7, wherein the memory is divided into a plurality of memory areas corresponding to the plurality of reference positions, respectively, wherein a size of each of the memory areas is defined based on an attribute of a reference position to which the each of the plurality of memory areas corresponds.

11. The map display device according to claim 7, wherein the memory is divided into a plurality of memory areas corresponding to the plurality of reference positions, respectively, wherein a size of each of the memory areas is defined based on a density of information of a part of map data corresponding to a region including a reference position to which the each of the plurality of memory areas corresponds.

12. The map display device according to claim 7, wherein regions corresponding to the plurality of reference positions are enlarged while preventing the regions from overlapping each other.

13. The map display device according to claim 7, wherein the plurality of reference positions include
a current position of a vehicle where the map display device is provided,
a destination of the vehicle, and
a point at a midway position between the current position and the destination when the current position and the destination are close to each other.

14. A method for a corridor function used in a map display device, the corridor function partially clipping map data, the map data including a plurality of minimum units, the minimum unit being defined as a smallest unit to be clipped from the map data, the method comprising:

determining a reference position;

specifying one of the minimum units of the map data, the one of the minimum units including the reference position;

defining four sections which are formed by evenly dividing the specified one of the minimum units lengthwise and breadthwise in the map data;

specifying one of the four sections within the specified one of the minimum units, the specified one of the four sections including the reference position;

determining a sequence of enlarging a region to be clipped based on the specified one of the four sections, the region including the reference position at a central part of the region;

clipping, in the map display device, a part of the map data corresponding to the region; and displaying a map of the region based on the clipped part of the map data.

15. The method of claim 14, the reference position representing a current position of a vehicle where the map display device is provided, further comprising after the part of the map data corresponding to the region including the reference position at the central part of the region is clipped, enlarging the region by clipping minimum units of map data, in the determined sequence of enlarging; and storing each of the clipped minimum units of map data in a corridor memory of the map display device.

16. The method of claim 15, the determined sequence forming a closed loop of minimum units of map data surrounding and continuously bordering the specified minimum unit which includes the reference position.

* * * * *